Aug. 16, 1932.   F. T. KERN   1,872,457
STORAGE SYSTEM
Filed July 26, 1929   4 Sheets-Sheet 3
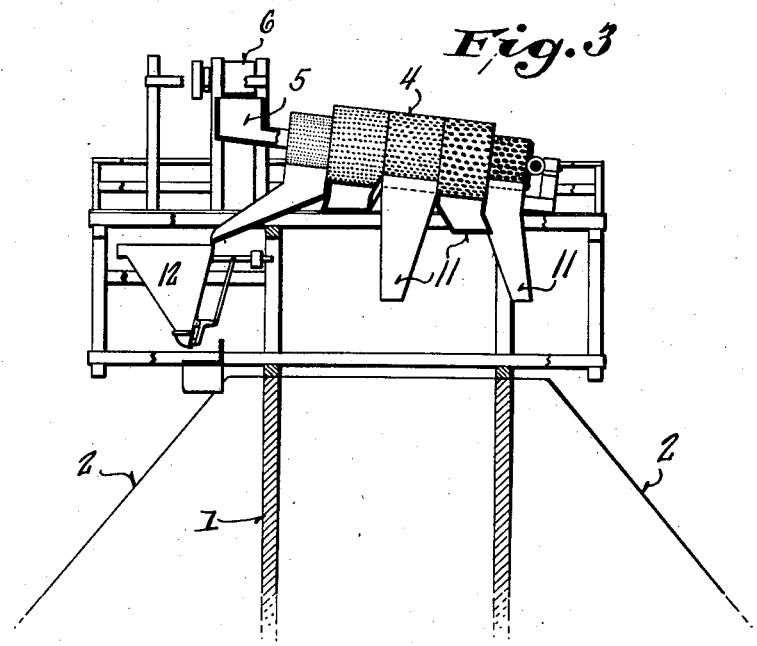
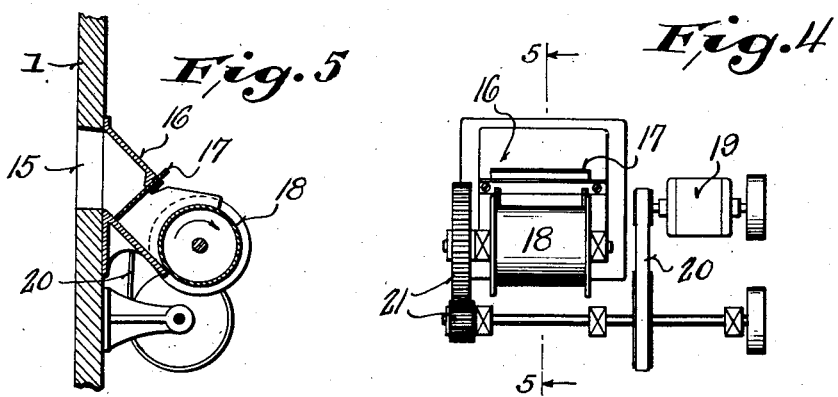
Inventor
Fred T. Kern
By Bottum Hudnall Lecher
McNamara & Michael
Attorney

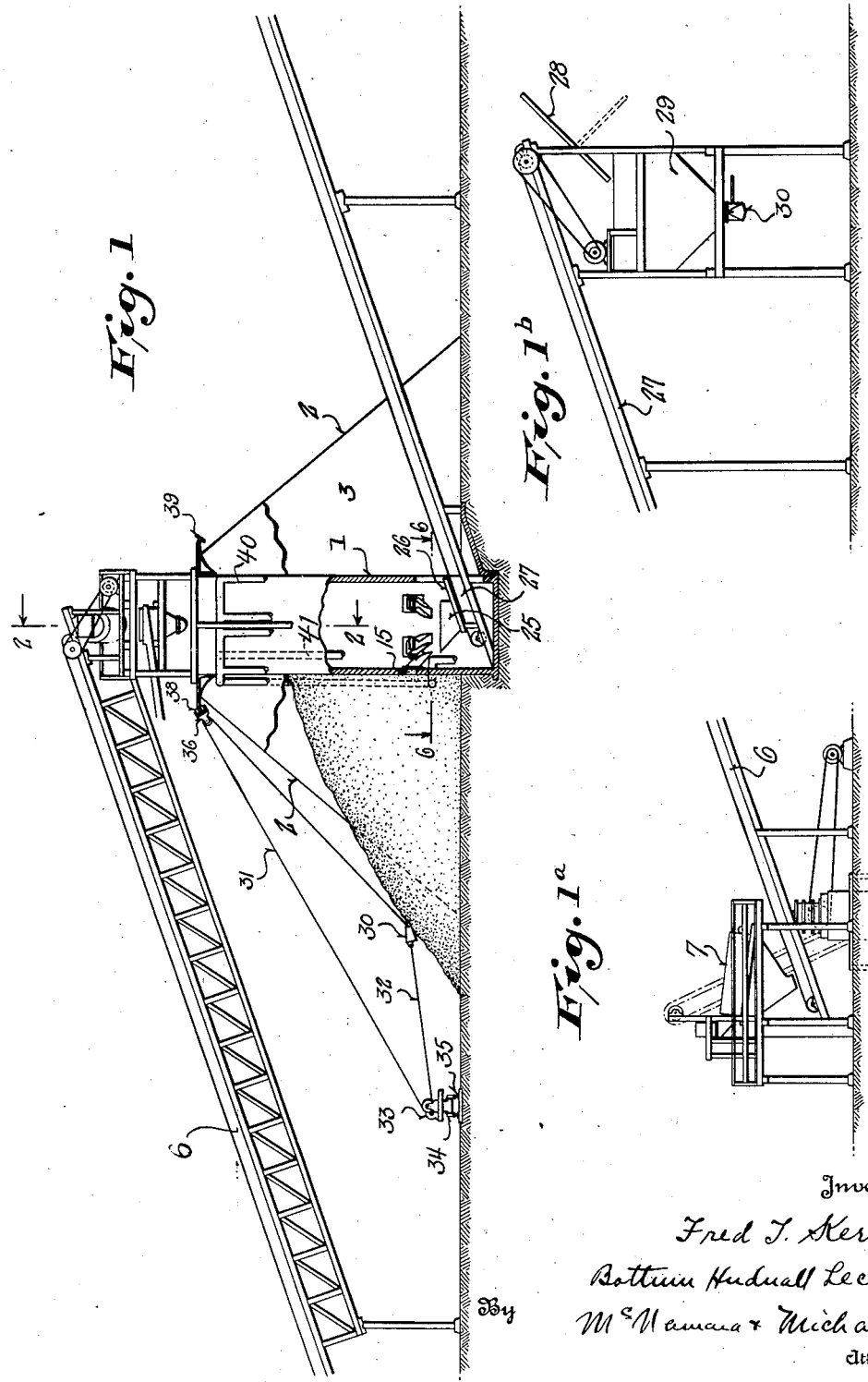
Aug. 16, 1932.  F. T. KERN  1,872,457
STORAGE SYSTEM
Filed July 26, 1929   4 Sheets-Sheet 1

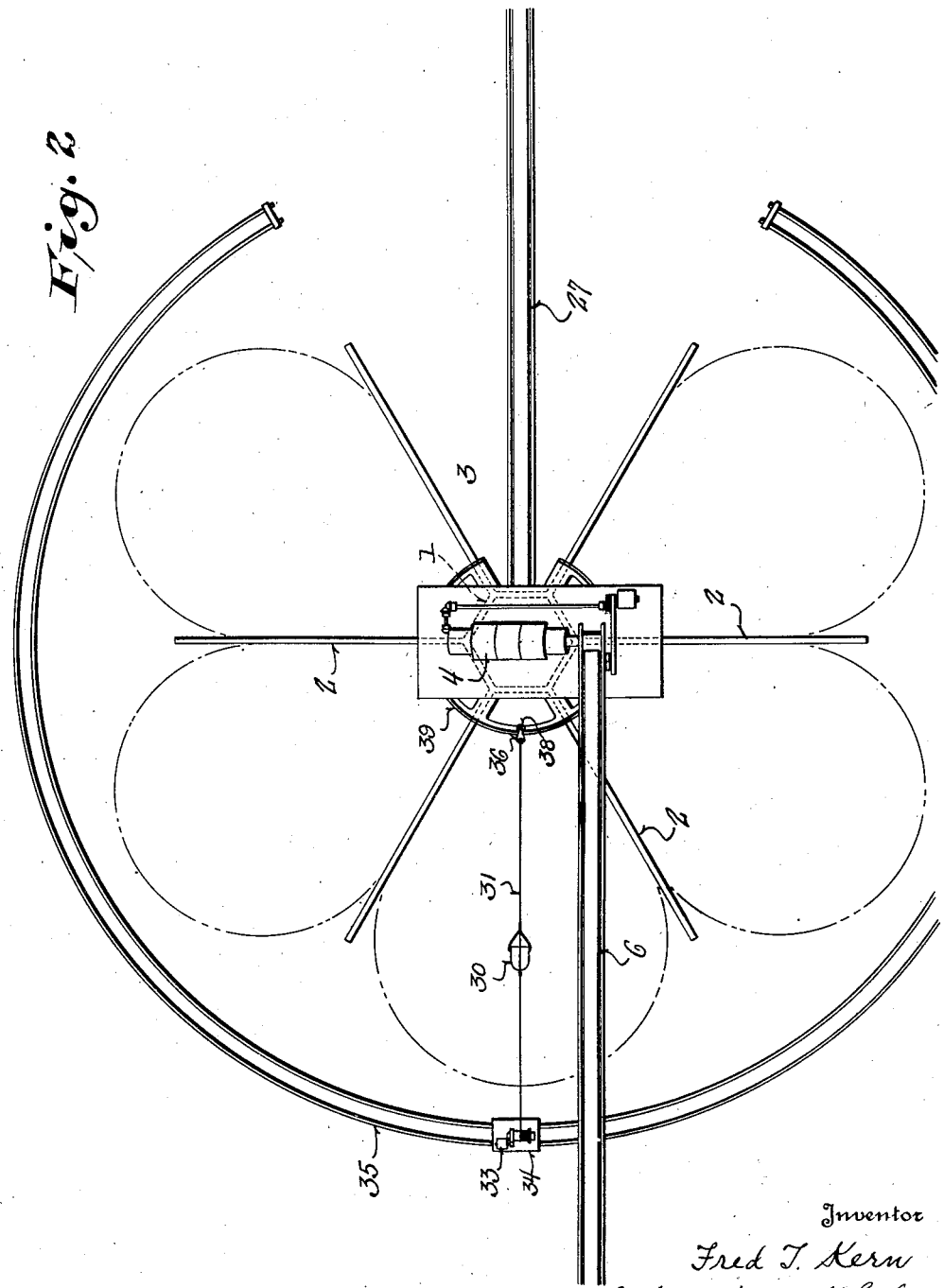

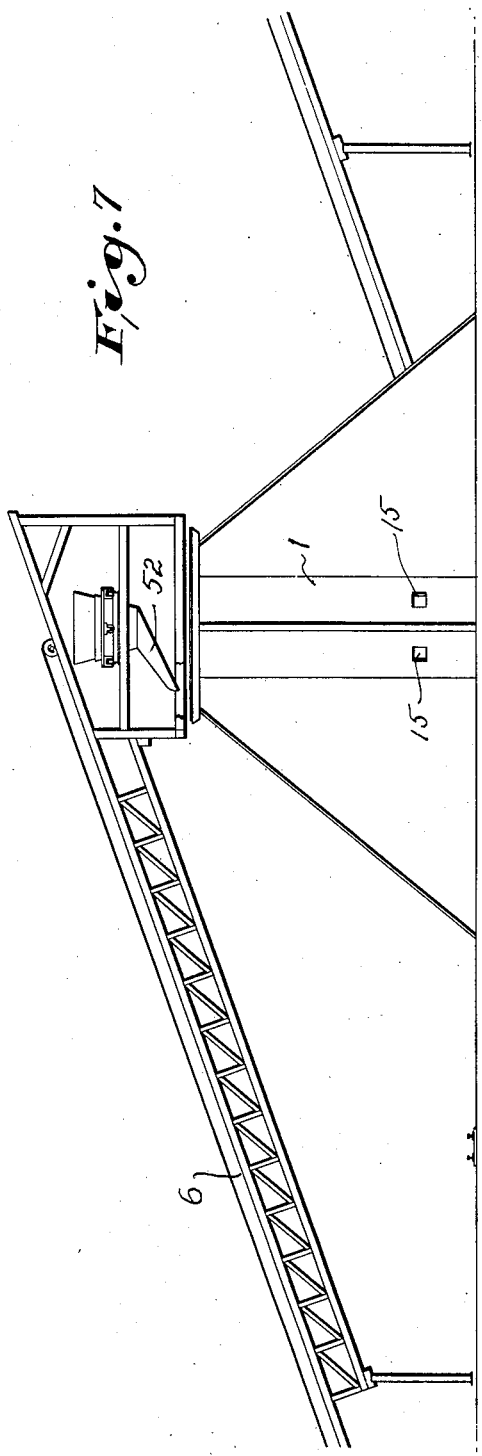
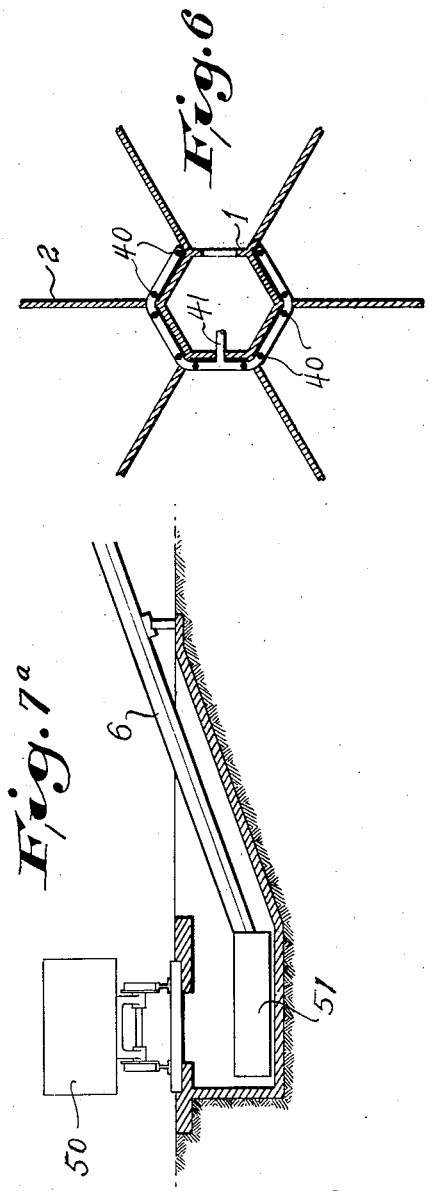

Patented Aug. 16, 1932

1,872,457

UNITED STATES PATENT OFFICE

FRED T. KERN, OF MILWAUKEE, WISCONSIN

STORAGE SYSTEM

Application filed July 26, 1929. Serial No. 381,158.

This invention relates generally to a system or apparatus for storing material such as gravel, stone, sand, and the like, and is especially designed for embodiment in a gravel plant or stock pile arrangement, although also adapted for other uses and applications.

The usual gravel plant employs a power shovel or a drag scraper for taking the raw material from the bed and depositing it on a conveyor which leads to a rock crusher. Leaving the crusher, the material is carried by a conveyor to the classifying and washing screens which serve to remove the clay, dirt, or the like, and to segregate the crushed raw material into sand and the various sizes of aggregate or gravel. The segregated material is discharged from the screens into the elevated bins. Usually, the sand passes through a sand tank located between the classifying screens and the bins provided for the sand, the sand tank serving to separate most of the water from the sand. The several bins in which the segregated material is stored have discharge chutes at their lower ends which are sufficiently elevated to permit of discharge of the material by gravity from the bins into railroad cars or into trucks and the like. In some plants, in lieu of having elevated bins, the bins are mounted over a tunnel through which a conveyor travels, the conveyor serving as a means for taking material discharged from the bins and conveying it to a railway car, truck, or the like. In the type of plant having the elevated bins, the bins not only have discharge chutes on one side for discharging the material into railway cars or trucks, but also have discharge chutes on their opposite sides for discharging the material onto conveyors which lead to stock piles. In either of the old types of gravel plants, elaborate constructions were involved, and such plants are erected at a high first cost and the maintenance and operating costs run into high figures. Another disadvantage of these old types is that they have but a limited capacity. Further, they involve the use of bins and the material in the bins does not have the opportunity to dry out as it does in a stock pile.

Further, where mixed material was deposited in the stock pile the larger and heavier sizes tended to slide down around the outside of the bottom of the pile and there was no way of preserving the several sizes of the mixed material properly admixed.

One of the principal objects of the present invention resides in the provision of a system or apparatus for handling material such as sand and gravel that is adapted for embodiment in a gravel plant or in a stock pile and which, in either instance, involves a low first cost and an economical maintenance and operating cost and yet increases the capacity of the plant and expedites the handling of the various material.

Another important object of the invention resides in the provision of an apparatus of this character which provides for the mixing of the various sizes of aggregate in any desired proportion.

Another object of the invention resides in the provision of means for mixing the material in any particular pile and distributing such material in such manner as may be best suited to varying conditions met with in the operation of such plants.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view in side elevation showing a portion of a gravel plant embodying the present invention, parts being broken away and shown in section for the sake of illustration;

Figure 1ª is a fragmentary view in elevation showing the structure that completes the left hand side of the apparatus shown in Figure 1;

Figure 1ᵇ is a view similar to Figure 1ª but showing the structure employed to complete the right hand side of Figure 1;

Figure 2 is a fragmentary top plan view of the apparatus shown in Figure 1;

Figure 3 is a view in section taken in the plane of line 3—3 of Figure 1 but showing parts in elevation for the sake of simplicity in illustration;

Figure 4 is a detail view in elevation showing one of the feeders employed;

Figure 5 is a sectional view taken on line 5—5 of Figure 4;

Figure 6 is a cross sectional view through the tower and partitions of the gravel plant of Figure 1;

Figure 7 is a fragmentary view in elevation of a form of the invention particularly adapted for use in connection with stock piles; and Figure 7ª is a fragmentary view in elevation showing the structure that completes the parts broken away at the left of Figure 7.

Referring to the drawings and more particularly to Figures 1 to 5, inclusive, illustrating the invention embodied in a gravel plant, the numeral 1 designates generally a central column or tower. This central tower or column is shown as being hollow and the present invention requires that at least the lower portion thereof be hollow. In cross section the tower is shown as being hexagonal, but its cross section may be varied. It may be of circular or of any polygonal form or of other shape. As shown in Figures 1 and 2, radially extending walls or dividing partitions 2 of any suitable number extend from the corners of the tower and define storage spaces 3. The storage spaces 3 enlarge outwardly as will be understood by comparing Figures 1 and 2 and they are completely separated from each other by the partitions 2 so that different grades or sizes of material may be stored in several storage spaces without danger of admixture. On the top of the tower classifying and washing screens designated generally at 4 are provided. The screens 4 are of conventional construction and are widely used in conventional gravel plants. As usual, the material is fed axially into the screens through a supply chute 5 which receives the material from a conveyor 6 leading up from a rock crusher 7 of conventional construction and having the usual means such as a belt conveyor and a hopper for supplying material thereto. The hopper may be located in a gravel pit and supplied with the raw material by a scraper or power shovel in the usual manner.

The material which leaves the screens 4 is carried by chutes 11 to the several storage spaces 3. The sand, before passing into its storage space, travels through the conventional sand settling tank 12.

The material is thus segregated into piles which are built up between the partitions 2 and against the portions of the tower 1 located between the partitions.

For the purpose of re-claiming the materials from the several piles, either separately or mixed in any desired proportions, the tower adjacent to or at its lower end is provided with a discharge opening 15 for each storage space. In other words, the portion of the tower between each pair of adjacent partitions 2 is provided with an opening and the opening opposite each space in which material is stored constitutes a discharge opening through which the material flows by gravity. Preferably, each discharge opening 15 is provided with a discharge chute 16 (see Figure 5) controlled by a sliding gate 17 which may be clamped in various positions to regulate the amount of material that passes through the chute. A conventional feeder 18 may be provided on each chute 16 and may be driven from an electric motor 19 by belt and pulley gearing 20 and toothed gearing 21. The chute 16, gate 17 and feeder 18 are all of conventional equipment now employed with the storage bins in gravel plants. The volume of material which is discharged is determined by opening or closing the gate 17 and by altering the speed of the feeder. The speed of the feeder may be altered by varying the ratio of the pulleys and the belt and pulley gearing 20, by varying the ratio of the gears 21 or by regulating the speed of the motor. The several chutes 16 all incline inwardly and downwardly toward the center of the interior of the tower and discharge to a hopper 25 supported on a suitable frame work 26 and delivering the material which it receives to an endless conveyor 27 leading upwardly to the point of deposit. The conveyor 27 may discharge directly into a truck or railway car or it may discharge onto a slide-way 28 leading into a bin or hopper 29 provided with a controlled outlet 30' which is adapted to discharge into a railway car or truck. As shown, one of the spaces 3 is not employed to store material, but is utilized to accommodate the conveyor 27.

With this arrangement the material as it comes from the screens is stored in individual stock piles and all of the advantages of stock piling are had. And yet all of the disadvantages of present stock piles are avoided. This is especially true in respect of the re-claiming of the material which is easily taken from any of the piles under the control of the feeders. This structure also makes it feasible and convenient to mix the several sizes of the aggregate in any desired proportions and to do this accurately. The proportions of any mixture are determined by regulating properly the extent to which the several gates 17 are opened and also by varying the speed at which the several feeders operate. These advantages are had and at the same time the expensive bin constructions or tunneling structure are eliminated.

As the material discharged from the screens builds up in the several storage compartments it may be desirable to pull some of it away from the tower to increase the capacity of the storage compartments. On the other hand, when the stock in any one storage compartment is running low and it is desirable to discharge practically all of the stock from any compartment the material should be piled up against the tower as closely as possible. In order to permit of this handling of the material in the several compartments a drag scraper 30 is provided and is controlled by lines 31 and 32 operated by the drums of a drag scraper hoist designated at 33 and constructed in accordance with the disclosure of the application of Fred T. Kern for hoist mechanism, filed January 16, 1929, Serial No. 332,761. In the present instance, however, the hoist 33 is mounted on a wheeled truck 34 traveling on a circular track 35 which extends around the storage spaces 3. The line 31 extends from its drum of the hoist out over a traveling pulley 36 and then back to the drag scraper 30. The pulley 36 has a yoke carrying rollers 38 which embraces a flanged rail 39 carried by the tower adjacent its upper end. Thus, as the hoist 33 moves around opposite any particular storage space 3, the pulley 36 follows the hoist, being pulled around by the lines 31 and 32. Thus, in any particular storage space, the drag scraper 30 may be utilized to pile the material up against the tower or to drag the material away from the tower.

This particular system of handling and storing the sand and the various sizes of gravel lends itself to winter operation as it is particularly susceptible of organization with means for heating the material. Thus, as shown in the drawings, heating pipes 40 may be provided in the several storage compartments and may be supplied with steam or other heating medium from a common supply pipe 41, which connects with a boiler or other heater. The pipes 40 are preferably located a few feet from the tower so as to effectively heat the material. During very cold weather, when ice forms in the material, it may be melted by passing steam through the pipes. This causes the ice in the material adjacent the pipes to melt and vaporize. The vapor diffuses through the mass of material and breaks down the ice for a considerable distance away from the tower.

Some of the principal features of the present invention are also well adapted for use in stock plants or stock piles, such as those found in distributing material from railroad cars to trucks or the like. In such plants the material is simply stored, it having been previously manufactured at a gravel plant and possibly also mixed in the desired proportions. A stock plant of this type is illustrated in Figures 7 and 7ª and differs from the form of the invention hereinabove described only in the omission of the rock crusher and its supply conveyor and in the omission of the classifying screens.

As shown in these figures the material is taken directly from a truck or railway car 50 and is discharged onto a feeder 51 which supplies the material to the conveyor 6. The conveyor 6, instead of discharging into classifying screens, discharges into a revolving chute or into a system of stationary chutes designated at 52, the function of the chutes 52 merely being to deposit the material into any selected one of the storage spaces.

The material is re-claimed in the storage spaces through the inlets 15 and may be mixed and/or conveyed away by means such as that shown at 18 and 27 of Figures 1 to 5.

The invention claimed is:

1. A storage system including a central tower, means for providing a plurality of storage spaces around said tower, a trackway extending around the tower, a drag scraper hoist movable around the track-way, a drag scraper actuated from said hoist through operating lines and a traveling pulley for one of said lines supported adjacent the upper end of the tower and movable thereabout under the influence of the drag scraper hoist, said drag scraper hoist being selectively employed to pile the material up against or drag the material away from the tower.

2. A storage system comprising a column, at least the lower portion of which is hollow, a plurality of partitions extending outwardly from the column and coacting therewith to define a plurality of separate unconfined storage spaces, said column having a discharge opening therein adjacent each storage space to provide for the discharge of material from any storage space into the interior of the column, means for supplying material to the storage spaces and means selectively operable in any storage space for piling material up against the column and for dragging material away from the same.

3. A storage system comprising a column, at least the lower portion of which is hollow, a plurality of partitions extending outwardly from the column and coacting therewith to provide a plurality of separate unconfined storage spaces, means for carrying material to the upper portion of the column and discharging it into the storage spaces, said column having discharge opening therein adjacent each storage space whereby the material may be taken from any storage space into the interior of the column, and means for transferring the material from the interior of the column to a point of deposit.

4. A storage system comprising means defining a common discharge zone, a plurality of angularly related partitions grouped about said common discharge zone, adjacent partitions diverging from each other and defining storage spaces abutting the discharge zone at their inner ends and unconfined at their outer ends, means for discharging material from any one of said storage spaces into said discharge zone, a conveyor for transferring the material discharged into said discharge zone to a point of deposit and means for supplying material to any one of said storage spaces, said last named means being operable and effective to supply material to said storage spaces when material is being discharged from any of said storage spaces into said discharge zone as well as when material is not being discharged from the discharge spaces into the discharge zone.

5. A storage system of the character described comprising a central column, the lower portion of which at least is hollow, a plurality of vertical, angularly related partitions extending outwardly from the column, adjacent partitions diverging from each other and providing outwardly enlarging storage spaces, the inner ends of which abut the column and the outer ends of which are open, each storage space having discharge means leading to the interior of the column, means regulating the rate of discharge from each storage space into the interior of the column, means for transferring the material discharged into the interior of the column to a point of deposit, and means associated with the upper end of the column for supplying material to any of the storage spaces.

6. A storage system of the character described comprising a central column, the lower portion of which at least is hollow, a plurality of vertical, angularly related partitions diverging from each other and providing outwardly enlarging storage spaces, the inner ends of which abut the column and the outer ends of which are open, each storage space having discharge means leading to the interior of the column, means regulating the rate of discharge from each storage space into the interior of the column, means for transferring the material discharged into the interior of the column to a point of deposit, means associated with the upper end of the column for supplying material to any of the storage spaces, a trackway extending around the column, a drag scraper hoist movable around the trackway, a drag scraper, operating lines connected to the drag scraper and actuated by the hoist and a traveling pulley for one of said lines supported adjacent to the upper end of the column and movable thereabout under the influence of the drag scraper hoist.

7. A storage system comprising means defining a common discharge zone, a plurality of vertical, angularly related partitions grouped about said common discharge zone, adjacent partitions diverging from each other, and defining storage spaces abutting the discharge zone at their inner ends and open at their outer ends, means for discharging material from any one of said storage spaces into said discharge zone and means for supplying material to any one of said storage spaces, said last named means being operable and effective to supply material to said storage spaces when material is being discharged from any of said spaces into said discharge zone, as well as when material is not being discharged from the discharge spaces into the discharge zone.

8. A storage system comprising means defining a common discharge zone, a plurality of vertical, angularly related partitions grouped about said common discharge zone, adjacent partitions diverging from each other, and defining storage spaces abutting the discharge zone at their inner ends and open at their outer ends, means for discharging material from any one of said storage spaces into said discharge zone and means for supplying material to any one of said storage spaces, said last named means being operable and effective to supply material to said storage spaces when material is being discharged from any of said spaces into said discharge zone, as well as when material is not being discharged from the discharge spaces into the discharge zone, and means selectively cooperable with the material in any storage space for dragging the material therein outwardly in the storage space and away from the discharge zone and also operable for piling the material in the discharge spaces in the inner portion thereof and adjacent to the discharge zone.

In witness whereof, I hereto affix my signature.

FRED T. KERN.